United States Patent [19]

Tieke

[11] Patent Number: 4,879,350
[45] Date of Patent: Nov. 7, 1989

[54] DEHYDROGENATED POLYCYCLOPENTADIENE

[75] Inventor: Bernd Tieke, Giffers, Switzerland

[73] Assignee: Ciba-Geigy Corporation, Ardsley, N.Y.

[21] Appl. No.: 95,074

[22] Filed: Sep. 11, 1987

[30] Foreign Application Priority Data

Sep. 19, 1986 [CH] Switzerland .......................... 3757/86

[51] Int. Cl.$^4$ .............................................. C08F 8/06
[52] U.S. Cl. .................................. 525/332.1; 525/356; 525/371
[58] Field of Search ....................... 525/332.1, 356, 371

[56] References Cited

U.S. PATENT DOCUMENTS 3,856,752 12/1974 Bateman et al. ...................... 260/65
4,618,454 10/1986 Ballard et al. .................... 525/332.1

FOREIGN PATENT DOCUMENTS 863237 3/1961 United Kingdom .

OTHER PUBLICATIONS

P. E. Blatz, J. Poly. Sci., Part C, 4, 1335 (1963).
P. E. Blatz et al., Polymer Preparation ACS, Div. Poly. Chem. 7, 616 (1966).
P. V. French et al., J. Chem. Soc. 1961, (1953).
J. Upadhyay et al., J. Poly. Sci. A-1, 5, 395 (1967).
S. Yen, Polymer Preparation ACS, Div. Poly. Chem. 4, 82 (1963).

Primary Examiner—Joseph L. Schofer
Assistant Examiner—Bernard Lipman
Attorney, Agent, or Firm—Luther A. R. Hall

[57] ABSTRACT

Dehydrogenated polycyclopentadiene which is insoluble in organic solvents, has a specific conductivity of at least $10^{-7}$ S.cm$^{-1}$ and contains essentially the recurring structural units of the formulae III to VIII

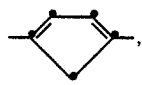 (III)

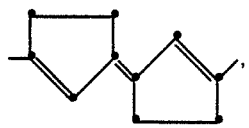

(IV)

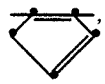

(V)

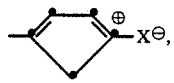

(VI)

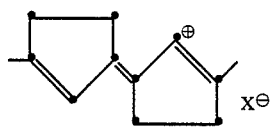

(VII)

and

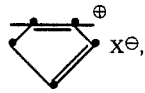 (VIII)

in which $X^-$ is an anion derived from iodine or a metal pentahalide or metalloid pentahalide, is obtained by treating polycyclopentadiene with iodine or a metal pentahalide or metalloid pentahalide and can be used as an electrically conducting material for the production of, for example, conductors, electrodes, batteries or semi-conductors, components.

5 Claims, No Drawings

DEHYDROGENATED POLYCYCLOPENTADIENE

The present invention relates to dehydrogenated polycyclopentadiene which is insoluble in organic solvents and has a specific conductivity of at least $10^{-7}$ S.cm$^{-1}$, to a process for its preparation by treating polycyclopentadiene with iodine or certain Lewis acids, such as metal pentahalides or metalloid pentahalides, and to the use thereof.

Polycyclopentadiene is known from the literature and consists predominantly of units of the formula I and, to a small extent, also of units of the formula II

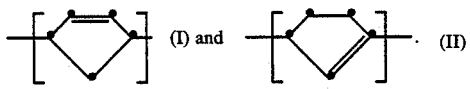 (I) and (II)

The preparation of an electrically conducting polymer by reacting polycyclopentadiene with bromine is disclosed in the Journal of Polymer Science, part C, no. 4, pages 1335 to 1346. Both the stability to the atmosphere of the polycyclopentadiene dehydrogenated in this manner and also the long-term stability of its electrical conductivity are inadequate.

It is reported in Polymer Preparation ACS, Div. Polym. Chem., 7(2), 616(1966), that, when polycyclopentadiene is treated with a protonic acid or a Lewis acid, the isolated double bonds present in the polymer are changed, in part, into conjugated double bonds. The Lewis acids employed are SbCL$_3$ and TiCl$_4$. It is also known from Journal Chem. Soc., 1961, pages 1953–1963 and from Journal of Polymer Science, part A - 1, volume 5, (1967), page 395, that colourless cyclopentadiene can be converted catalytically in the presence of trichloroacetic of trifluoroacetic acid into a deeply coloured polymer which is insoluble in organic solvents. Details relating to the electrical conductivity of these polymers are lacking in the literature. Our own tests have shown, however, that the dehydrogenated polycyclopentadiene obtained by these processes has electrical properties which have an inadequate long-term stability for applications as an electrical material exposed to the atmosphere.

It has now been found that treating polycyclopentadiene with iodine or metal or metalloid pentahalides affords a dehydrogenated polycyclopentadiene which is insoluble in organic solvents and which is distinguished by a better electrical conductivity and a better long-term stability of the conductivity in the atmosphere.

The present invention therefore relates to dehydrogenated polycyclopentadiene which is insoluble in organic solvents, has a specific conductivity of at least $10^{-7}$ S.cm$^{-1}$ and contains essentially the recurring structural units of the formulae III or VIII

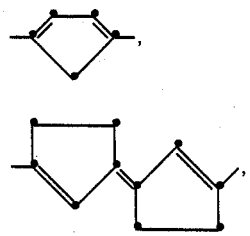

(III)

(IV)

 (V)

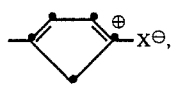 (VI)

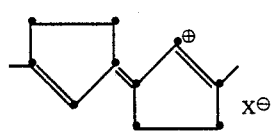 (VII)

and

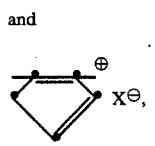 (VIII)

in which X$\ominus$ is an anion derived from iodine or from a metal pentahalide or metalloid pentahalide.

X$^-$ in the formulae VI to VIII preferably represents an iodide ion or an anion of the formulae SbCl$_6^-$, SbF$_6^-$, AsF$_6^-$ or PF$_6^-$, particularly an iodide ion.

Dehydrogenated polycyclopentadiene which is insoluble in organic solvents and has a specific conductivity of at least $10^{-7}$ S.cm$^{-1}$ and contains the recurring structural units of the formulae III to VIII can be prepared in accordance with the invention by treating polycyclopentadiene with iodine or a metal pentahalide or metalloid pentahalide as an oxidizing agent, at least 0.5 mol of I$_2$ or at least 1 mol of a metal pentahalide or metalloid pentahalide being employed per mol of the monomer unit present in the polycyclopentadiene.

It is preferable to employ at least 1 mol of I$_2$ or at least 2 mol of a metal pentahalide or metalloid pentahalide and especially at least 1.5 mol of I$_2$ or at least 2.5 mol of a metal pentahalide or metalloid pentahalide per mol of the monomer unit present in the polycyclopentadiene.

If more than 0.5 mol of I$_2$ per mol of monomer unit is employed in the process according to the invention, it is possible for the anions of iodine formed to be not only iodide ions but also ions of the formula I$_z^-$ in which z is 3 or an odd integer greater than 3.

Examples of suitable metal pentahalides and metalloid pentahalides which can be employed in the process according to the invention are SbCl$_5$, SbF$_5$, AsCl$_5$, AsF$_5$, BiF$_5$, PF$_5$, PBr$_5$ or PCl$_5$. The oxidizing agent preferably used in the process according to the invention is iodine, SbCl$_5$, SbF$_5$, AsF$_5$ or PF$_5$, in particular iodine.

The metal pentahalides and metalloid pentahalides to be used in the process according to the invention are known and are in some cases commercially available. Polycyclopentadiene and processes for its preparation are likewise known. Polycyclopentadiene can, for example, be prepared by the method described in Polymer Preprints 4, no. 2, 82 (1983), by polymerizing cyclopentadiene using a Ziegler-Natta catalyst (triisobutylaluminium/titanium tetrachloride). In the process according to the invention it is preferably to employ a polycyclopentadiene having an average molecular weight of $5 \times 10^2$ to $10^6$. The dehydrogenation of the polycyclopentadiene can be carried out either in solution, employing as the solvents organic solvents which do not react with the oxidizing agents, for example carbon tetrachloride, chloroform, cyclohexane, 1,2-dichloroethane, benzene or toluene, or in solid form, for example in the form of a film or coating.

The dehydrogenated polycyclopentadiene obtained by the process according to the invention is a solid, darkcoloured to black substance which is insoluble in organic solvents and has an electrical conductivity of, preferably, at least $10^{-6}$ S.cm$^{-1}$. The dehydrogentated polycyclopentadiene according to the invention has, in particular, an electrical conductivity of at least $10^{-5}$ S.cm$^{-1}$.

The dehydrogenated polycyclopentadiene according to the invention can be employed as an electrically conducting material for the production of conductors, electrodes, batteries, switchgear and semi-conductor components and also in imparting an antistatic finish or electromagnetic screening to electronic components.

The dehydrogenated polycyclopentadiene is advantageously processed, as an electrically conducting material, together with polymers which are soluble in organic solvents, preferably in the form of electrically conducting films or coatings.

The present invention therefore also relates to compositions containing dehydrogenated polycyclopentadiene and a polymer soluble in an organic solvent.

Compositions of this type can, for example, be prepared by treating mixtures of polycyclopentadiene and a polymer soluble in an organic solvent, preferably present together in the form of films or coatings, with an oxidizing agent indicated above. It is also possible, however, to add dehydrogenated polycyclopentadiene present, for example, in the form of powder, to the appropriate polymer in the melt or in the form of solutions, in order to obtain the composition.

The compositions preferably contain at least 10% by weight, in particular at least 25% by weight, of dehydrogenated polycyclopentadiene, relative to the total weight of dehydrogenated polycyclopentadiene and polymer soluble in organic solvents, for example a polyimide containing phenylindane radicals.

Polymers soluble in organic solvents are to be understood, in the context of the present invention, as meaning polymers having a solubility of at least 10 g of polymer per litre of organic solvent, preferably at least 20 g of polymer per litre of organic solvent.

The compositions according to the invention preferably contain, as polymers soluble in organic solvents, a polyimide containing phenylindane radicals.

Polyimides which are soluble in organic solvents and contain a phenylindane radical are disclosed in German Patent No. 2,446,383 and consist essentially of the recurring unit of the formula

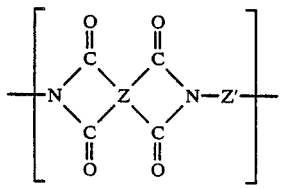

in which the four carbonyl groups are attached to different carbon atoms and each pair of carbonyl groups is in the ortho-position or peri-position relative to one another, Z is a tetravalent radical containing at least one aromatic ring and Z' is a divalent organic radical selected from aromatic, aliphatic, alkyl-aromatic, cycloaliphatic and heterocyclic radicals, combinations thereof and radicals having bridge groups containing oxygen, sulfur, nitrogen, silicon or phosphorus, subject to the proviso that (1) out of the total number of recurring polyimide units, (A) in 0 to 100 mol % of such units Z is a phenylindane radical of the structural formula

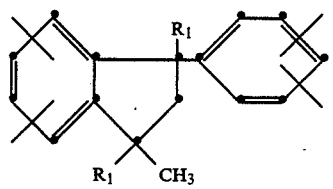

in which $R_1$ is hydrogen or an alkyl radical having 1 to 5 carbon atoms, and (B) in 0 to 100 mol % of such units Z' is a phenylindane radical of the structural formula

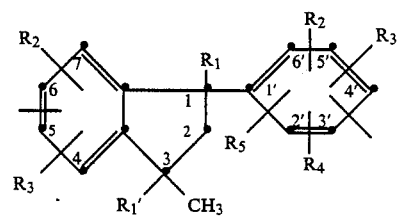

in which $R_1$ is hydrogen or an alkyl group having 1 to 5 carbon atoms and $R_2$, $R_3$, $R_4$ and $R_5$ independently of one another are hydrogen, halogen or alkyl groups having 1 to 4 carbon atoms, and (2) out of the total number of the radicals Z and Z', at least 10 mol % are phenylindane radicals.

Reference should be made to the description in this patent specification in respect of the preparation and preferred ranges of these polyimides.

The following should be mentioned as examples of organic solvents for soluble polyimides: N,N-dimethylformamide, N,N-dimethylacetamide, N-methyl-2-pyrrolidone, N,N-dimethylformamide, N,N-diethylacetamide, N-methylcaprolactam, dioxane, dimethyl sulphoxide, tetramethylurea, pyridine, dimethyl sulphone, hexamethyl phosphoric acid amide, tetramethylene sulphone, formamide, N-methylformamide, γ-butyrolactone, tetrahydrofuran, m-creson, phenol, 2-methoxyethyl acetate, 1,2-dimethoxyethane, bis-(2-methoxyethyl) ether, chloroform and nitrobenzene.

The solvents can be used on their own or in combination with solvents or in combination with diluents, such as benzene, benzonitrile, xylene, toluene and cyclohexane.

The compositions according to the invention are suitable for the production of self-supporting, electrically conducting films having a high glass transition temperature and ultimate tensile strength. Such films can be used in the field of electronics or microelectronics, for example as conducting composite materials in the production of electrical conductors, electrodes, batteries, switchgear or semi-conductor components, and also in imparting an antistatic finish or electromagnetic screening to electronic components.

The polycyclopentadiene (PCPD) used in the following examples was synthesized using TiCl₄ as a cationic initiator analogously to the operating instructions for the preparation of polysipiroheptadiene in J. Polymer Sci. Polym. Chem. Ed. 11 (1973) 1917.

Yield: 74% of theory. Content of 1,4-units $=\geq 99\%$ (determined by NMR spectroscopy). $[\eta]=0.18$ (determined in toluene at 30° C.).

Elementary analysis: found C=89.77%, calculated:C=90.85%; fou,nd H=9.03%, calculated:H=9.15%.

EXAMPLE 1

0.66 g [10 mmol per unit of monomer] of PCPD is dissolved in 50 ml of CCl₄ under N₂ in a threenecked flask equipped with a stirrer, a reflux condenser and a dropping funnel. A solution of 6.35 g [25 mmol] of iodine in 250 ml of CCl₄ is put in the dropping funnel. The iodine solution is then added dropwise, with stirring, while the temperature is kept constant at 20° C.. A violet-black precipitate is formed after a short time. When the dropwise addition is complete, the mixture is boiled under reflux, with stirring, for 18 hours. It is then cooled and the precipitate is filtered off with suction in an atmosphere of nitrogen. It is rinsed with three times 50 ml of CCl₄. The product is dried in a high vacuum at 30° C..

2.15 g of a black, insoluble powder are obtained.

Specific conductivity, determined on a powder moulding at room temperature:

Elementary analysis: found: C=30.97%, H=2.89%; I=65.77%.

EXAMPLE 2:

The procedure of Example 1 is repeated, except that 1.65 g [25 mmol per unit of monomer] of PCPD in 50 ml of CCl₄ and 6.35 g [25 mmol] of iodine in 250 ml of CCl₄ are employed.

4.22 g of a black, insoluble powder are obtained. Specific conductivity, determined on a powder moulding at room temperature:

Elementary analysis: found: C=40.78%, H=3.52%, I=50.61%.

EXAMPLE 3:

The procedure of Example 1 is repeated, except that 1.32 g [20 mmol per unit of monomer] of PCPD are dissolved in 150 ml of CCl₄ and 11.96 g [40 mmol] of SbCl₅ in 15 ml of CCl₄ are added dropwise.

4.26 g of a black, insoluble powder are obtained. Specific conductivity, determined on a powder moulding at room temperature:

Elementary analysis: found C=28.02%, H=2.16%, Sb=30.70%, Cl=36.14%.

EXAMPLE 4:

1.0 g of I₂ crystals are placed in a thoroughly dried 700 ml vessel which has been flushed with argon and is equipped with a stirrer. Glass supports coated with PCPD (film thickness approx. 1 μm) are then put into the vessel. Coating is effected by spin coating (concentration of the PCPD solution: 0.1 mg/ml of toluene; speeds of rotation: 30 seconds at 1200 r.p.m. and then 30 seconds at 3,000 r.p.m.).

After about 3 hours the PCPD films assume a brown-red colour. After approx. 24 hours they are completely black and exhibit a bluish-metallic reflection.

Increase in weight (after 48 hrs.): 2.98 mg of iodine/mg of polymer.

Specific conductivity, determined on a powder moulding at room temperature: after 48 hrs.: $3.1\times 10^{-5}$ S. cm-1.

What is claimed is:

1. A dehydrogenated polycyclopentadiene which is insoluble in organic solvents, having a specific conductivity of at least $10^{-7}$ S.cm$^{-1}$ and containing essentially the recurring structural units of the formulae III to VIII

(III)

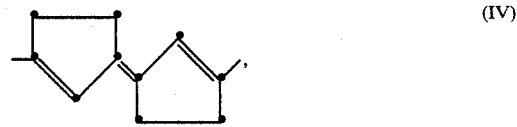

(IV)

(V)

(VI)

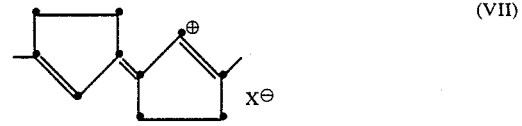

(VII)

(VIII)

in which X⊖ is an anion derived from iodine or from a metal pentahalide or metalloid pentahalide.

2. A dehydrogenated polycyclopentadiene according to claim 1, in which X⁻ in the formulae VI to VIII is an iodide ion or SbCl₆⁻, SbF₆⁻, AsF₆⁻ or PF₆⁻.

3. A process for the preparation of dehydrogenated polycyclopentadiene which is insoluble in organic solvents, has a specific conductivity of at least $10^{-7}$ S.cm$^{-1}$ and contains essentially the recurring structural elements of the formulae III and VIII according to claim 1, by treating polycyclopentadiene with an oxidizing agent, which comprises employing, as the oxidizing agent, at least 0.5 mol of I₂ or at least 1 mol of a metal pentahalide or metalloid pentahalide per mol of monomer unit present in the polycyclopentadiene.

4. A process according to claim 3, wherein at least 1 mol of I₂ or at least 2 mol of a metal pentahalide or metalloid pentahalide are employed per mol of monomer unit present in the polycyclopentadiene.

5. A process according to claim 3, wherein the oxidizing agent used is iodine, SbCl₅, SbF₅, AsF₅ or PR₅.

* * * * *